Oct. 13, 1970    E. S. FIRESTONE ET AL    3,533,636

HIGH TORQUE COLLET

Filed Jan. 10, 1968      2 Sheets-Sheet 1

INVENTORS.
EUGENE S. FIRESTONE
CHRIS SKOUSGAARD
BY
Lyon & Lyon
ATTORNEYS

Oct. 13, 1970   E. S. FIRESTONE ET AL   3,533,636
HIGH TORQUE COLLET
Filed Jan. 10, 1968   2 Sheets-Sheet 2
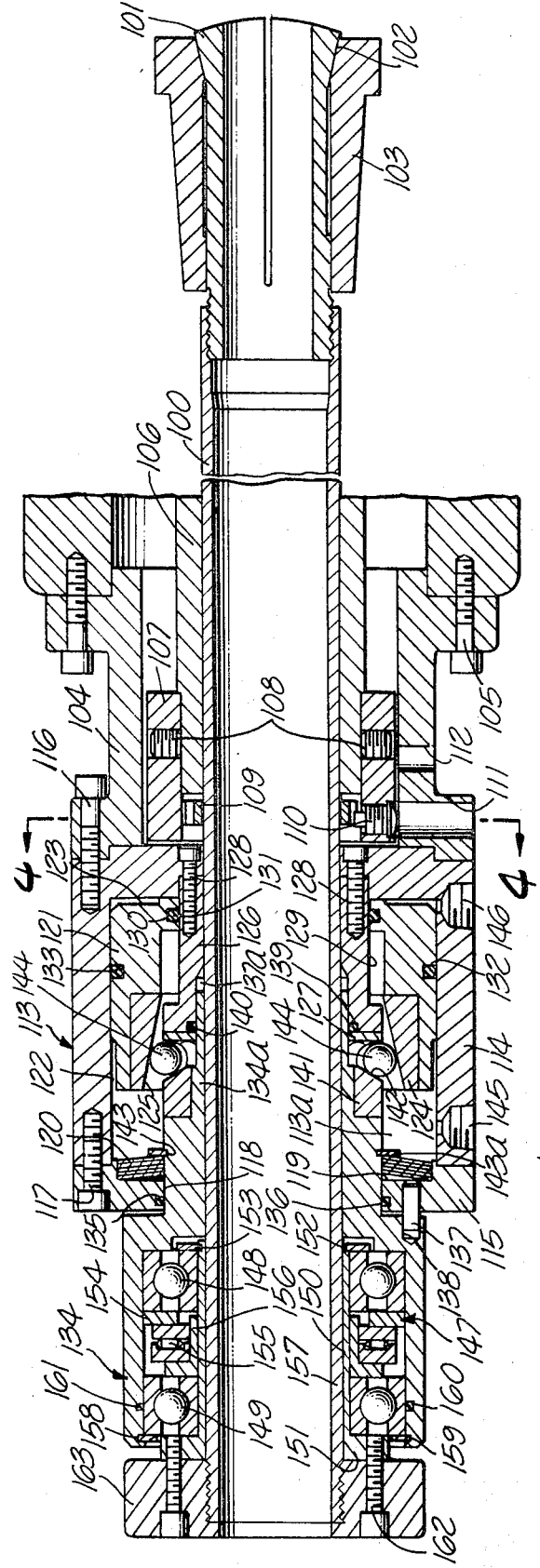
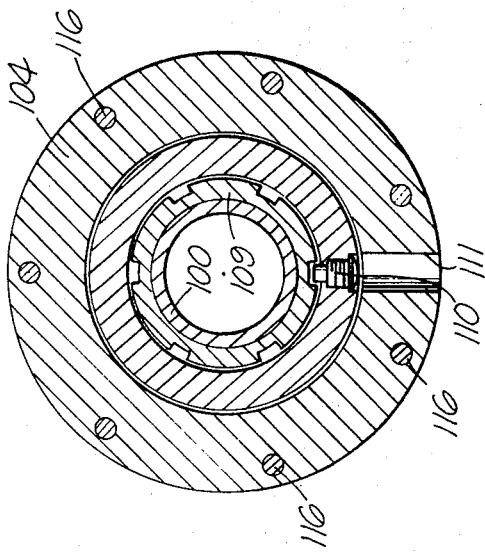
INVENTORS.
EUGENE S. FIRESTONE
CHRIS SKOUSGAARD
BY
ATTORNEYS

United States Patent Office 3,533,636
Patented Oct. 13, 1970

3,533,636
HIGH TORQUE COLLET
Eugene S. Firestone, North Hollywood, and Chris Skousgaard, Lake Arrowhead, Calif.; said Skousgaard assignor to said Firestone, doing business as E. S. Firestone Engineering Co., North Hollywood, Calif.
Filed Jan. 10, 1968, Ser. No. 696,786
Int. Cl. B23b 31/20, 31/30
U.S. Cl. 279—4                                12 Claims

ABSTRACT OF THE DISCLOSURE

An apparatus to hold a work piece securely when increased torque is applied to it, having instant release features. A piston is used to force a split ring type collet open and shut. A modified form of the apparatus permits it to be connected to a lathe with a minimum number of parts rotating.

---

This invention relates to a collet apparatus and is particularly directed to improvements in the immediate opening and closing of a fluid motor actuated split ring type collet.

Collet devices in use today have a tendency to stick or jam upon release of the work piece. Deterioration of parts is another problem because of the necessity and application of large forces to hold the work piece secure.

Prior Pat. No. 3,208,759 was primarily concerned with creating a mechanical advantage of such a nature to prevent slippage when increased torque was applied to a work piece. This device uses a similar mechanical advantage but eliminates the problem of jamming and reduces the wearing of parts. In addition, certain parts have been eliminated to reduce the possibility of malfunctioning and to decrease the cost of production. The device of the present invention also reduces unwanted vibration generally associated with high speed lathe collet closures.

In the drawings:

FIG. 3 is a sectional plan view showing a modification.

FIG. 4 is a transverse sectional view taken substantially on the lines 4—4 as shown in FIG. 3.

Figure 1:
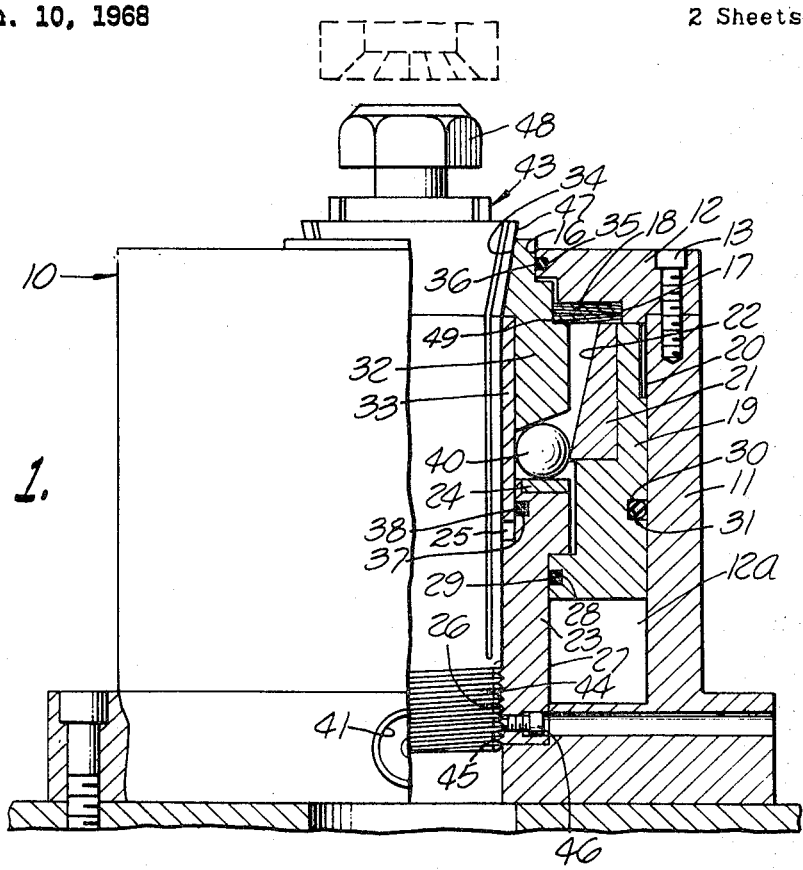
FIG. 1 is a side view partly in section showing the device in a closed position.

Referring to the drawings, a housing assembly, generally designated 10, includes a body 11 and a cap 12. The housing assembly 10 defines a piston chamber 12a. The body 11 is in the shape of a flanged cylinder and is affixed to the cap 12 by means of threaded fasteners 13. Provided within the body 11 are passages 14 and 15. The cap 12 has a central circular opening 16 and on its lower side is relieved as at 17 to form a cup-like member adapted to receive springs 18. A pair of Belleville type springs may be used and one of the springs may be inverted to provide a greater compressive force.

A piston 19 is provided with three inner walls of various diameters in a stepped fashion and a notch 20 and is coaxially positioned within the body 11. Mounted within the upper part of piston 19 and against the inner wall having the greatest diameter is a piston insert 21 formed of high strength steel with a beveled inner wall 22.

A ball base 23 receives a ball ring collar 24, preferably formed of high strength steel. The ball base 23 is connected to body 11 by the threaded fasteners, not shown, and is provided with internal threads 26. The inner wall of the piston 19 having the smallest diameter slidably engages the outer wall 27 of the ball base 23 and the piston 19 has an annular groove 28 therein receiving an O-ring 29 for sealing the piston 19 to the ball base 23. The piston 19 has an annular groove 30 in its outer wall receiving an O-ring 31 for sealing piston 19 to the inner wall of the body 11.

A sleeve 32 is provided centrally of housing assembly 10 and extends through the circular opening 16 in the cap 12. A cylindrical sleeve guide 33 is mounted coaxially within the sleeve 32. The sleeve 32 at its upper end is beveled at 34 and may be chromium plated in this area. The cap 12 has an annular groove 35 therein for receiving an O-ring 36 to seal the sleeve 32 to the cap 12. The inner wall of the ball base 23 defines a sleeve guide chamber 25 within which the sleeve guide 33 moves axially. The ball base 23 has an annular groove 37 therein for receiving an O-ring 38 to seal the sleeve guide 33 to the ball base 23. The sleeve 32 has a tapered lower wall 39.

A plurality of balls 40 are seated on the ball ring collar 24. In a particular commercial form of the device fifteen hard chromed balls of .375 inch diameter are employed.

A terminal 41 by means of the passage 15 supplies fluid, such as air, to the notch 20 and the space above piston 19 and piston insert 21. While it is recognized that various fluids may be used to move the piston, in practice air is used and for the remainder of this specification the fluid will be designated as air. A terminal 42 by means of passage 14 supplies air to the bottom of piston 19.

Figure 2:
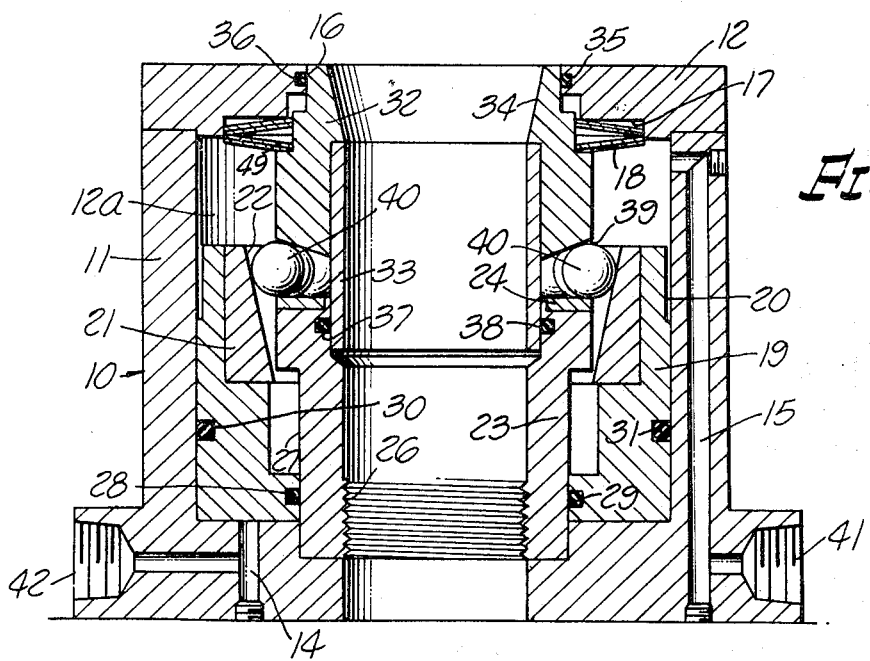
FIG. 2 is a sectional side view of the device showing it in an open position.

Referring now more particularly to FIGS. 1 and 2, the device is illustrated in use with a split ring type collet 43, which collet is split only throughout a portion of its length and it is solid in the region 44 where it is threaded to mate with the internal threads 26 of the ball base 23. The threads on the collet 43 are provided with a vertical groove 45. One of three threaded fasteners 46, such as dog screws, spaced 120° apart and extending through an opening in the ball base 23 engage the groove 45 so that the collet 43 may be prevented from turning within the ball base 23. Openings in the body 11 and ball base 23 allow a means to be inserted to tighten said fasteners 46. The collet 43 is generally cylindrical in shape, but adjacent its upper end is beveled outwardly as at 47 on a taper complementary to the bevel 34 on the upper end of the sleeve 32. In FIG. 1 the device is shown containing a work piece 48.

The operation of the above-described device is as follows. With the collet being in the open position as shown in FIG. 2 the work piece 48 is inserted. Air is then passed under pressure through the terminal 42 through passage 14 into the space below piston 19. This drives the piston 19 from the position as shown in FIG. 2 to the position shown in FIG. 1. In so doing the bevel 22 on the piston insert 21 engages the balls 40 and forces them back into the fully seated position as shown in FIG. 1. As the balls 40 are forced inwardly they engage the taper 39 of sleeve 32 which forces the sleeve upwardly. As the sleeve 32 passes upwardly the taper 34 presses against the taper 47 of the collet 43 and forces the collet into a closed or grippnig position. A flange 49 on the sleeve 32 when in the closed position as shown in FIG. 1 abuts the springs 18 and compresses them.

When it is desired to open the collet air under pressure is passed through the terminal 41 through passage 15 into the notch 20 and the space above the piston 19 and the piston insert 21. This forces the piston 19 downward freeing the balls 40 and permitting them to move outwardly as the compressive force of the springs 18 pushes the sleeve 32 downward into the open position.

In the modified form of my invention, shown in FIGS. 3 and 4, the same principles are applied in adapting the device for use on a lathe.

A draw tube 100 connected at one end to a split ring collet 101 extends through the machine head and through the device. The tube 100 is positioned coaxially within the device and rotates freely within it. The collet 101 is split only throughout a portion of its length and is solid in the region where it is attached to the draw tube 100. The collet is generally cylindrical in shape, but adjacent its upper end is beveled outwardly as at 102. The collet 101 rests within a cylindrical collar 103 which is rotatably mounted within the machine head. The upper end of the collar is beveled inwardly on a taper complementary to the bevel 102 on the collet.

An adapter 104 is cylindrical in shape with a flange at each end. Threaded fasteners 105 connect one end of the adapter 104 to the machine head. A drive sleeve 106 is positioned coaxially within the adapter 104 and is connected to a spindle 107 by a series of threaded fasteners 108. A notched adjusting ring 109 is fitted around the draw tube 100 and may be attached by means of gluing. After the collet 101 has been hand adjusted a locking screw 110 which is connected to and extends through the drive sleeve 106 is advanced to extend into one of the notches of the ring 109 thereby providing a means to drive the draw tube 100 without preventing axial movement of the tube. A circular opening 111 in the adapter 104 provides a means whereby a turning tool can engage the screw 110. Another opening 112 in the adapter 104 enables excess fluid and particles which might accumulate in the area between tube 100 and the adapter 104 to drain.

A housing assembly 113 includes a body 114 and a cap 115. The housing assembly 113 defines a piston chamber 113a. The body 114 is in the shape of a flanged cylinder and is connected to the adapter 104 by threaded fasteners 116. The cap 115 is affixed to the body 114 by means of threaded fasteners 117 and has a central circular opening 118 with its lower side relieved as at 119 to form a cup-like member adapted to receive springs 120. In practice a pair of Belleville type springs may be used and to provide greater compressive force one of the springs may be inverted.

A piston 121 is provided with three inner walls of various diameters in a stepped fashion and notches 122 and 123. Mounted within the piston 121 and against the inner wall of the greatest diameter is a piston insert 124 formed of high strength steel with a beveled inner wall 125.

A ball base 126 receives a ball ring collar 127, preferably formed of high strength steel. The ball base 126 is connected by threaded fasteners 128 to the body 114 and is generally cylindrical in shape. The inner wall of the piston 121 having the smallest diameter slidably engages the outer wall 129 of the ball base 126 and the piston 121 has an annular groove 130 therein receiving an O-ring 131 for sealing the piston 121 to the ball base 126. The piston 121 has an annular groove 132 in its outer wall receiving an O-ring 133 for sealing piston 121 to the inner wall of the body 114.

A housing sleeve 134 with a sleeve guide 134a is provided centrally of housing assembly 113 and extends through the circular opening 18 in the cap 115. The cap 115 has an annular groove 135 therein for receiving an O-ring 136 to seal the sleeve 134 to the cap 115. A cylindrical pin 137 is press fitted to the cap 115 with one end extending beyond the cap and positioned within a tubular opening 138 in the housing sleeve 134. This pin 137 prevents the housing sleeve 134 from rotating with the draw tube 100 and relative to the housing assembly 113, but still allows the sleeve 134 to move axially relative to the housing assembly 113. A portion of the inner wall of the ball base 126 defines a sleeve guide chamber 137a within which the sleeve guide 134a moves axially. The ball base 126 has an annular groove 139 therein for receiving an O-ring 140 which seals the sleeve 134 to the ball base 126. Mounted on the sleeve 134 is a sleeve ring 141 having a tapered wall 142 and preferably formed of high strength steel. An annular groove 143 in the outer wall of the housing sleeve 134 is adapted to receive a snap ring 143a to engage the springs 120 as indicated.

A plurality of balls 144 are seated in the ball ring 127. In a particular commercial form of the device, fifteen hard chromed balls of .375 inch diameter are employed.

A terminal 145 supplies air to the space above piston 121 and the piston insert 124. A terminal 146 supplies air to the space between the notch 123 in the piston 121 and the body 114.

Mounted coaxially within the end of the housing sleeve 134 is a bearing assembly, generally designated as 147. Included within the bearing assembly, are a pair of ball bearing sets 148 and 149 which are coaxially fitted around the circumference of a cylindrical shell 150 with a flanged end 151. The outer wall of bearing set 148 remains stationary and is positioned against the inner wall of the housing sleeve 134. The bearing set 148 rotates about the shell 150 and the shell 150 is provided with an annular groove 152 to receive a snap ring 153 which prevents relative movement of the bearing set 148 with respect to the shell 150. A spacer 154 separates the bearing set 148 from the needle bearing set 155. The needle bearing set rests on a cylindrical spacer 156 having a flange 157. The flange 157 separates the bearing set 149 and the needle bearing set 155. The inner wall of the bearing set 149 remains stationary and is positioned against the outer wall and the flanged end 151 of the shell 150. The bearing 149 rotates on the inner surface of the housing sleeve 134 and the housing sleeve is provided with an annular groove 158 to receive a snap ring 159 which prevents relative movement of the bearing set 149 with respect to the housing sleeve 134. Another annular groove 160 in the housing sleeve 134 receives an O-ring 161 which seals the bearing set 149 to the housing sleeve 134.

Threaded fasteners 162 connect the cylindrical shell 150 to a hand wheel 163. The hand wheel 163 is attached to the draw tube 100.

The operation of the modified form of the device is as follows. With the collet being in an open position a work piece is inserted. Air is then passed under pressure through the terminal 146 into the space under the piston 121. This drives the piston 121 towards the cap 115. In so doing the bevel 125 on the piston insert 124 engages the balls 144 and forces them into a fully seated position. As the balls 144 are forced inwardly they engage the taper 142 on the sleeve ring 141 which forces the sleeve 134 away from the machine head compressing the springs 120 between the cap 115 and the lock snap ring 144. As the sleeve 134 moves it causes the draw tube 100 to similarly move pressing the taper 102 of the split ring collet 101 against the taper of the cylindrical collar 103 forcing the collet 101 into a closed or gripping position.

During operation of the lathe neither the adapter 104, sleeve 134, nor the parts mounted within the housing assembly 113, excluding the draw tube 100, rotate.

To open the collet 101 air is forced through terminal 145 into the space above the piston 121 and the piston insert 124. This forces the piston 121 away from the cap 115 freeing the balls 144 and permitting them to move outwardly as the compressive force of the springs 120 pushes the sleeve 134 and the draw tube 100 forward into the open position.

In the operation of both forms of the device the springs provide for a quick release of the work piece. The chromium plating of certain parts reduces sticking. By applying the force of the piston in the same direction as the desired movement of the sleeve and housing sleeve the deterioration of parts is decreased.

Having fully described our invention, it is to be understood that we do not wish to be limited to details herein set forth, but our invention is of the full scope of the appended claims.

We claim:

1. In a device of the type described, the combination of a housing assembly, a piston in said housing assembly, means for moving said piston, a sleeve positioned in said housing assembly, said sleeve having a frustoconical upper section adapted to engage the tapered wall of a split ring collet to close said collet, means to prevent axial movement of said piston, a piston chamber which defines the movement of said piston, and means operably connecting said sleeve to said piston for movement in the same direction therewith, and causing said sleeve to move substantially less than said piston.

2. The combination set forth in claim 1 wherein said sleeve is chromium plated in the area it engages the split ring collet.

3. The combination set forth in claim 1 wherein springs are mounted on said housing assembly and engage said sleeve, said springs cooperating with said piston moving means and acting on said sleeve in the direction of movement of said piston when said collet is being opened.

4. The combination set forth in claim 3 wherein said springs comprise a plurality of Belleville washers which act in opposition to the axial upward movement of said sleeve, said springs being mounted concentrically with said sleeve.

5. In a device of the type described the combination of: a housing assembly, an adapting means for connecting said housing assembly to one side of the machine head of a lathe, a draw tube extending through the machine head and connected at one end to a split ring collet, a cylindrical collar rotatably mounted on the other side of the machine head and adapted to engage the tapered wall of the collet, a drive sleeve positioned coaxially within said adapting means and connected to the spindle of the lathe, a notched adjusting ring attached to said draw tube, means secured to said drive sleeve and operably engaging said ring, a piston in said housing assembly, means for moving said piston, a housing sleeve positioned coaxially within said housing assembly and operably connected to said piston for movement in a direction therewith, said housing sleeve operably connected to said draw tube for movement therewith to force the tapered collet to close and open, a piston chamber which defines the movement of said piston, and means within said housing assembly for limiting the movement of said housing sleeve whereby the movement of said piston is substantially greater than the movement of said housing sleeve.

6. The combination set forth in claim 5 wherein said cylindrical collet is chromium plated in the area it engages the split ring collet.

7. The combination set forth in claim 5 wherein said adjusting ring has several axially extending slots, said means engaging said ring includes a threaded fastener having a square end, said square end is received by one of said axially extending slots to maintain rotational alignment and rotate said draw tube without preventing axial movement of said draw tube.

8. The combination set forth in claim 5 wherein springs are mounted in said housing assembly and engage said housing sleeve, said springs cooperating with said piston moving means when said collet is being opened.

9. The combination set forth in claim 8 wherein said springs comprise a plurality of Belleville washers which act in opposition to the axial upward movement of said sleeve, said springs being mounted concentrically with said sleeve.

10. In a device of the type described the combination of: a housing assembly, an adapting means for connecting said housing assembly to the machine head of a lathe, a piston in said housing assembly, a means for moving said piston, a draw tube connected to a split ring collet, a cylindrical collar adapted to engage the tapered wall of the collet, a housing sleeve positioned in said housing assembly and operably connected to said draw tube for movement therewith forcing the tapered collet to engage the cylindrical collar, a piston insert concentrically mounted on said piston, a sleeve ring connected to said housing sleeve and having a lower wall which is tapered outwardly, said piston insert having an inner wall which is tapered outwardly, a ball base fixedly mounted between said sleeve and said piston, a plurality of balls seated on said ball base and engaging the lower tapered wall of said sleeve ring and also engaging an outward taper on the inner wall of the piston insert, a bearing assembly mounted coaxially between said housing sleeve and said draw tube, said bearing assembly comprising a pair of ball bearing sets for radial loads, a cylindrical sleeve, said ball bearing sets being mounted coaxially about said cylindrical sleeve and between said sleeve and said housing sleeve, a needle bearing set mounted between said ball bearing sets for axial loads, spacer means to transmit the axial load from said ball bearing sets to said needle bearing set, means to prevent relative movement of all of said bearing sets with respect to said housing sleeve.

11. In a device of the type described the combination of: a housing assembly, an adapting means for connecting said housing assembly to one side of the machine head of a lathe, a piston in said housing assembly, means for moving said piston, a draw tube extending through the machine head and connected at one end to a split ring collet, a cylindrical collar rotatably mounted on the other side of the machine head and adapted to engage the tapered wall of the collet, a housing sleeve positioned coaxially within said housing assembly and operably connected to said piston for movement in a direction therewith, said housing sleeve operably connected to said draw tube for axial movement therewith, a piston chamber which defines the movement of said piston, means within said housing assembly to limit the movement of said housing sleeve to a substantially less distance than the movement of said piston, a drive sleeve positioned coaxially within said adapting means and connected to the spindle of the lathe, means operably connecting said drive sleeve and said draw tube for rotation of said draw tube relative to said housing sleeve, and bearing means between said housing sleeve and said draw tube and axially spaced from said piston.

12. The combination set forth in claim 11, wherein said bearing means comprises a pair of ball bearing sets for radial loads, a cylindrical sleeve, said ball bearing sets being mounted coaxially about said cylindrical sleeve and between said cylindrical sleeve and said housing sleeve, a needle bearing set mounted between said ball bearing sets for axial loads, spacer means to transmit the axial load from said ball bearing sets to said needle bearing set, and means to prevent relative movement of all of said bearing sets with respect to said housing sleeve.

References Cited

UNITED STATES PATENTS

| | | | | |
|---|---|---|---|---|
| 3,168,322 | 2/1965 | Dziedzic | 279—50 | XR |
| 3,176,553 | 4/1965 | Schubert | 279—50 | XR |
| 3,208,759 | 9/1965 | Firestone et al. | 279—4 | |

ROBERT C. RIORDON, Primary Examiner

DONALD D. EVENSON, Assistant Examiner

U.S. Cl. X.R.

279—50